(12) United States Patent
Misono et al.

(10) Patent No.: US 7,852,005 B2
(45) Date of Patent: Dec. 14, 2010

(54) FLUORESCENT LAMP WITH EXTERNAL ELECTRODE, BACKLIGHT, AND DISPLAY DEVICE

(75) Inventors: Masayoshi Misono, Chosei (JP); Reiji Torai, Chiba (JP); Yoshiharu Takeda, Mobara (JP)

(73) Assignees: Hitachi Displays, Ltd., Chiba (JP); Hitachi Display Devices, Ltd., Chiba (JP)

( * ) Notice: Subject to any disclaimer, the term of this patent is extended or adjusted under 35 U.S.C. 154(b) by 1225 days.

(21) Appl. No.: 11/447,950

(22) Filed: Jun. 7, 2006

(65) Prior Publication Data

US 2006/0284536 A1  Dec. 21, 2006

(30) Foreign Application Priority Data

Jun. 8, 2005  (JP)  ............... 2005-167804

(51) Int. Cl.
*H01J 65/00* (2006.01)
*H01J 61/30* (2006.01)

(52) U.S. Cl. .................. 313/607; 313/634; 313/609

(58) Field of Classification Search ........... 313/234, 313/246, 485, 491, 607, 634, 609; 315/158; 349/70; 362/97.2; 345/102
See application file for complete search history.

(56) References Cited

U.S. PATENT DOCUMENTS

| | | | |
|---|---|---|---|
| 6,515,433 B1* | 2/2003 | Ge et al. ............... | 313/493 |
| 7,061,465 B2* | 6/2006 | Yajima et al. ............... | 345/102 |
| 7,211,939 B2* | 5/2007 | Lim ............... | 313/234 |
| 7,538,478 B2* | 5/2009 | Terada et al. ............... | 313/234 |
| 2002/0041268 A1* | 4/2002 | Yajima et al. ............... | 345/102 |
| 2006/0002115 A1* | 1/2006 | Jeong ............... | 362/260 |
| 2009/0115342 A1* | 5/2009 | Lam et al. ............... | 315/276 |

FOREIGN PATENT DOCUMENTS

| | | |
|---|---|---|
| JP | 2002-072205 | 3/2002 |
| JP | 2004-079268 | 3/2004 |

* cited by examiner

*Primary Examiner*—Peter Macchiarolo
(74) *Attorney, Agent, or Firm*—Antonelli, Terry, Stout & Kraus, LLP.

(57) ABSTRACT

The invention relates to a fluorescent lamp with an external electrode used as a backlight of a liquid crystal display device or others. To reduce invalid parts of the backlight, the length in an axial direction of an external electrode of the fluorescent lamp is required to be reduced. Therefore, a concave portion is provided to the end of the fluorescent lamp with an external electrode, and by forming the external electrode in the concave portion, the total area of the external electrodes is secured. Even if the length in the axial direction of the external electrode is short, discharge is stabilized. Graphite is used for the external electrode; however, graphite in which a water glass component is increased to enhance its mechanical strength is used.

23 Claims, 13 Drawing Sheets

FIG. 5
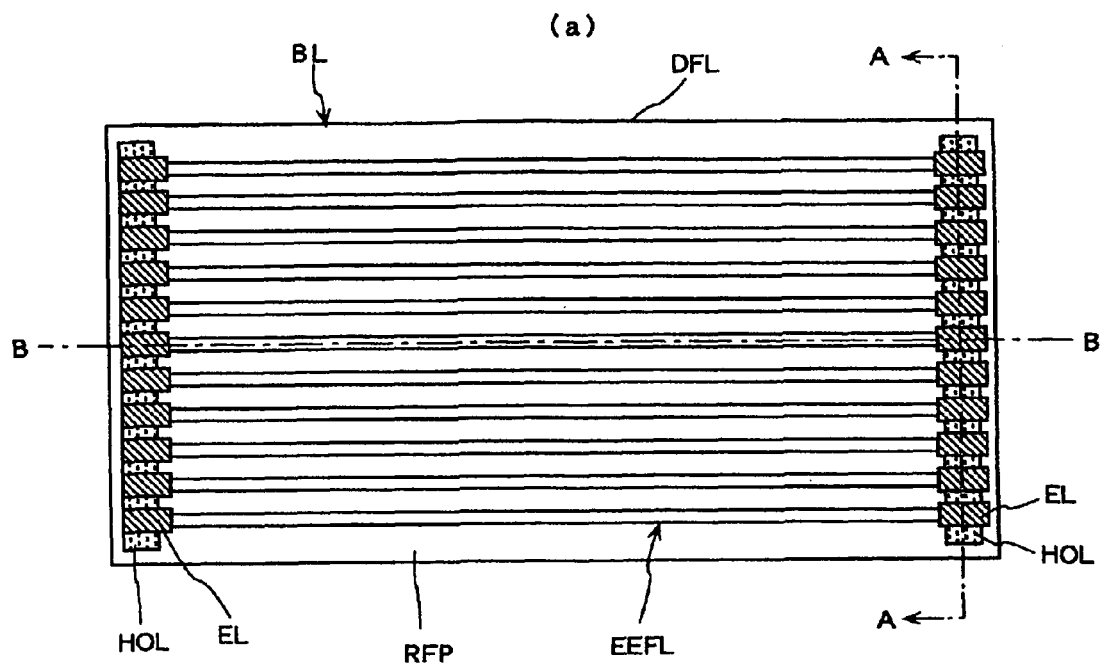
(a)
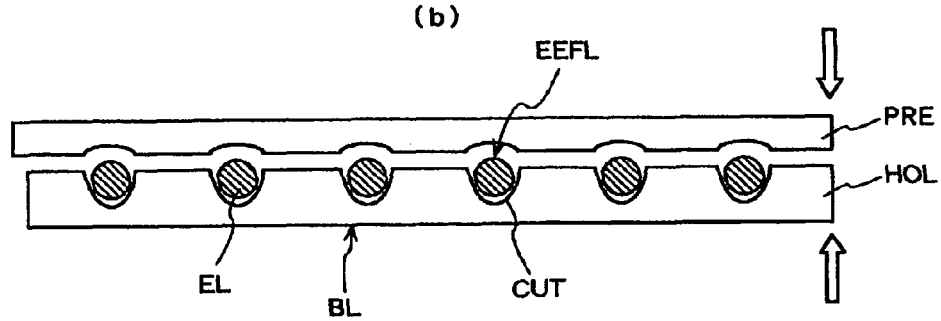
(b)
FIG. 6
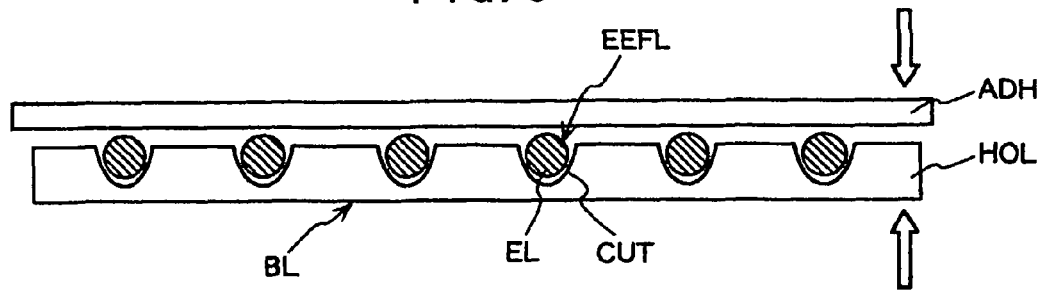

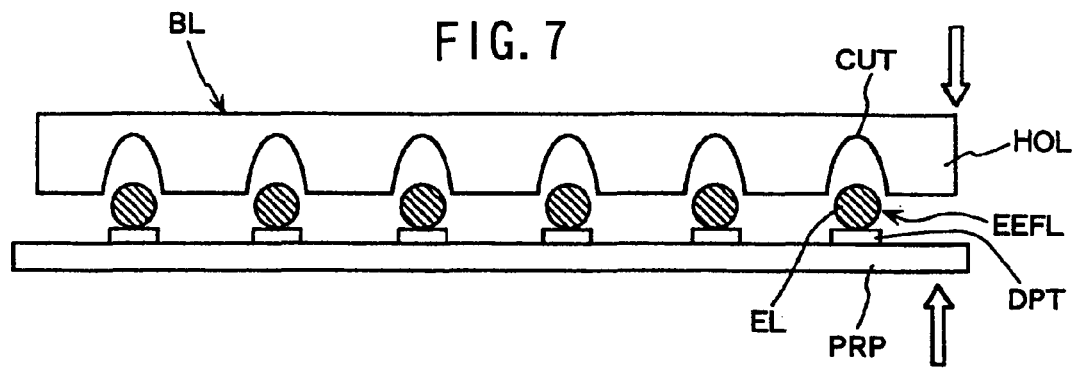
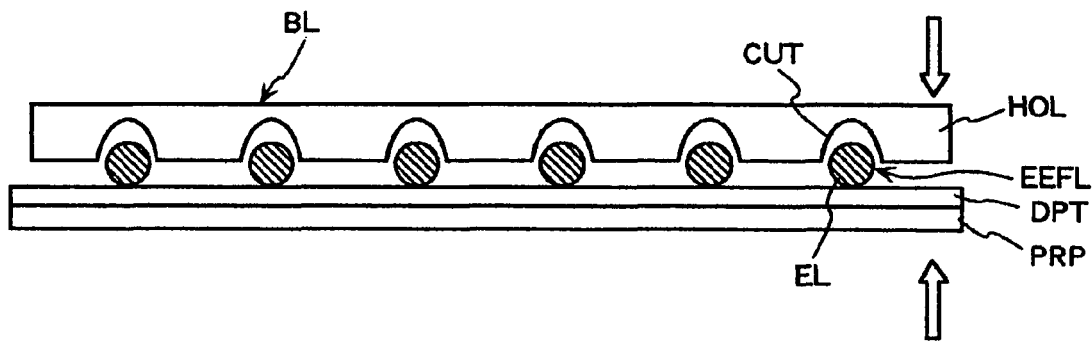
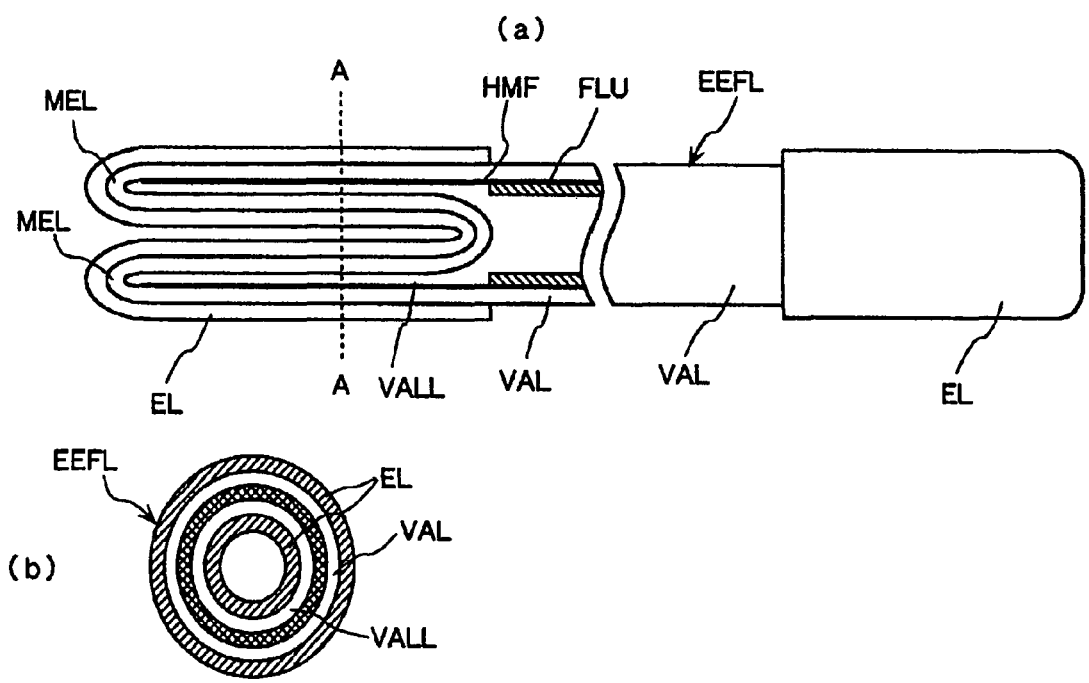

FLUORESCENT LAMP WITH EXTERNAL ELECTRODE, BACKLIGHT, AND DISPLAY DEVICE

CLAIM OF PRIORITY

The present application claims priority from Japanese Application JP 2005-167804 filed on Jun. 8, 2005, the content of which is hereby incorporated by reference into this application.

FIELD OF THE INVENTION

The present invention relates to a fluorescent lamp with an external electrode, a backlight and a display device, and particularly relates to a fluorescent lamp with an external electrode suitable for a light source of a display panel, a backlight using the fluorescent lamp with an external electrode for the light source and a display device in which the backlight is mounted, and detailedly relates to electrode structure of the fluorescent lamp with an external electrode.

BACKGROUND OF THE INVENTION

In a display device using a liquid crystal display panel which is a non-radiative type, an electronic latent image formed on the liquid crystal display panel is visualized by providing external lighting means. In the external lighting means, a lighting system is installed at the back or in front of the liquid crystal display panel other than a structure utilizing natural light. Particularly in a display device requiring high intensity, a structure in which a lighting system is provided at the back of a liquid crystal display panel is utilized. This is called a backlight.

The backlight roughly includes a side edge type and a direct type. The side edge type has structure in which a linear light source represented by a cold cathode fluorescent lamp is installed along the side edge of a light transmission plate made of a transparent plate and is often used for a display device requiring thinning, e.g., a small thickness as for a personal computer or the like. In the meantime, in a large-sized liquid crystal display device such as a display device used for a display monitor or a television set, the direct type is often used. A direct backlight has a structure in which a lighting system is installed immediately under the back of a liquid crystal display panel.

Heretofore, for a light source for a liquid crystal backlight of a liquid crystal television, a personal computer and others, a cold cathode fluorescent lamp is generally used. However, in addition to this, there is an external electrode type fluorescent lamp which is attracting attention. The cold cathode fluorescent lamp has a structure in which a pair of electrodes is arranged oppositely inside a sealed glass tube, while the external electrode type fluorescent lamp has a structure in which an electrode is closely attached outside a sealed glass tube. Many advantages such as reducing the cost of connected circuits, simplifying a procedure for manufacture and extending the service life can be expected for the external electrode type fluorescent lamp.

However, the external electrode type fluorescent lamp has a problem that non-radiative length (electrode length) is extended because of its structure. As the area of a frame is being reduced in a recent display device, the reduction of electrode length at the back of the frame means the reduction of the surface area of an electrode in the external electrode type fluorescent lamp and the efficiency of discharge is deteriorated. In other words, if only the surface area of the electrode can be maintained or increased at the same time when the electrode length is reduced, the area of the frame can be reduced without deteriorating the efficiency of discharge.

For the solution of the above-mentioned problem, a configuration in which an electrode part is bent to maintain the surface area of an electrode in place of reducing electrode length is disclosed in a patent document 1, Japanese Patent Laid-open No. 2002-72205. Additionally, a configuration in which the end of a glass tube is made slightly concave to enhance the efficiency of discharge is disclosed in a patent document 2, Japanese Patent Laid-open No. 2004-79268.

SUMMARY OF THE INVENTION

However, in the configuration disclosed in the patent document 1, a space which a glass tube occupies in a backlight is unchanged. In addition, it is not easy to bend the glass tube. Further, the configuration has a problem that the handling of a lamp is also made more difficult. As the surface area of an electrode does not vary greatly in the configuration disclosed in the patent document 2, the configuration has a problem that the reduction of electrode length cannot be expected as a result and its manufacturing process is difficult.

Therefore, the invention is made to solve the problems of the above-mentioned conventional types and the object is to provide a fluorescent lamp with an external electrode where the efficiency of discharge is maintained or fluorescence having high discharge efficiency is acquired by reducing electrode length and increasing the surface area of an electrode.

Another object of the invention is to provide a fluorescent lamp with an external electrode the configuration of which is simple, which can be easily manufactured and the structure of a tube of which is hardly damaged.

Besides, another object of the invention is to provide a backlight where space in which the fluorescent lamp with an external electrode occupies is reduced and high-intensity light is acquired and the handling of which is facilitated.

Further another object of the invention is to provide a display device where high-intensity and high-quality image display is acquired at saved energy by radiating light having high discharge efficiency by the fluorescent lamp with an external electrode.

To achieve such objects, according to the fluorescent lamp with an external electrode according to the invention, as electrode length is reduced and the surface area of the electrode is increased by forming the fluorescent lamp by the glass tube on an inner wall of which a fluorescent film is formed, inside which noble gas or noble gas and mercury is/are filled and which transmits light and the external electrode acquired by forming a graphite film on each outside face of both ends of the glass tube, the problems of the background art can be solved.

According to another fluorescent lamp with an external electrode according to the invention, as electrode length is reduced and the surface area of the electrode is increased by forming at least one concave portion made concave toward the center at both ends of a glass tube desirably in the above-mentioned configuration and also forming a graphite film on the concave portion, the problems of the background art can be solved.

According to the backlight according to the invention, as light having high discharge efficiency is acquired by being provided with the fluorescent lamp with an external electrode, a reflector arranged at the back of the fluorescent lamp with an external electrode and a frame for housing the fluorescent lamp with an external electrode and the reflector and forming the fluorescent lamp with an external electrode by the glass tube on the inner wall of which a fluorescent film is formed, inside which noble gas or noble gas and mercury is/are filled and which transmits light and the external electrode acquired by forming a graphite film on each outside face of both ends of the glass tube, the problems of the background art can be solved.

According to another backlight according to the invention, light having high discharge efficiency can be realized by being provided with at least one concave portion made concave toward the center at both ends of a glass tube of a fluorescent lamp with an external electrode desirably in the above-mentioned configuration and also forming a graphite film on the concave portion.

The display device according to the present invention includes a display panel for displaying an image, and the backlight arranged at the back of the display panel. The backlight is provided with the fluorescent lamp with an external electrode, the reflector arranged at the back of the fluorescent lamp with an external electrode, and the frame for housing the fluorescent lamp with an external electrode and the reflector. The fluorescent lamp with an external electrode includes a fluorescent film formed on the inner wall thereof, the light-transmitting glass tube inside of which noble gas or noble gas and mercury are filled, and the external electrode acquired by forming a graphite film on each outside face of both ends of the glass tube. Thereby, light having high discharge efficiency is obtained, and high-intensity image display is acquired.

According to another display device according to the invention, as light having high discharge efficiency is acquired by being provided with at least one concave portion made concave toward the center at both ends of a glass tube of a fluorescent lamp with an external electrode of a backlight desirably in the above-mentioned configuration and also forming a graphite film on the concave portion, high-intensity image display can be realized.

The invention is not limited to the above-mentioned configuration and various changes without deviating from the technical idea according to the invention are allowed.

BRIEF DESCRIPTION OF THE DRAWINGS

FIGS. 5A and 5B show the configuration in a first embodiment of the backlight according to the invention, where FIG. 5A is a plan showing a main part viewed from the top, and FIG. 5B is an enlarged sectional view viewed along a line A-A shown in FIG. 5A;

FIG. 6 is an enlarged sectional view showing the configuration in a second embodiment of the backlight according to the invention;

FIG. 7 is an enlarged sectional view showing the configuration in a third embodiment of the backlight according to the invention;

FIG. 8 is an enlarged sectional view showing the configuration in a fourth embodiment of the backlight according to the invention;

FIGS. 9A and 9B show the configuration in a fifth embodiment of the fluorescent lamp with an external electrode according to the invention, where FIG. 9A is a sectional view viewed in a longitudinal direction of a tube, and FIG. 9B is a sectional view viewed along a line A-A in a direction perpendicular to the longitudinal direction of the tube;

FIG. 10A is a sectional view viewed in a longitudinal direction of a tube, and FIG. 10B is a sectional view viewed along a line A-A in a direction perpendicular to the longitudinal direction of the tube;

DETAILED DESCRIPTION OF THE PREFERRED EMBODIMENTS

Figure 1:
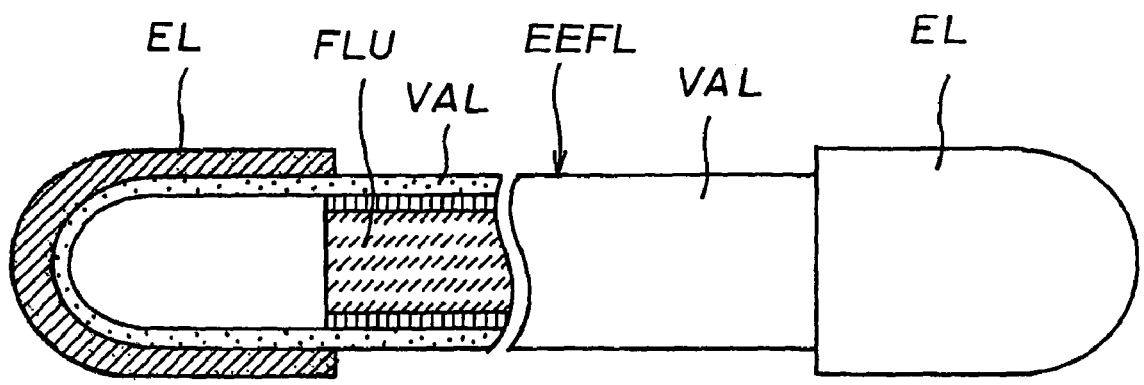
FIG. 1 is an enlarged sectional view showing a main part of the configuration in a first embodiment of a fluorescent lamp with an external electrode according to the invention.

Referring to the drawings, preferred embodiments of the invention will be described in detail below.

First Embodiment

FIG. 1 is an enlarged sectional view of a main part for explaining the configuration in a first embodiment of a fluorescent lamp with an external electrode according to the invention. As for the fluorescent lamp with an external electrode EEFL shown in FIG. 1, noble gas and mercury vapor or only noble gas is filled inside a glass tube VAL which is also called an overcoat tube and transmits light and further, its inner wall is coated with a fluorescent film FLU made of rare earth fluorescent material. A pair of external electrodes EL having a graphite film acquired by applying and drying graphite paste including graphite as main conductive material are formed at both ends of the outside of the glass tube VAL. It is suitable that the thickness of the graphite film applied on each periphery of both ends of the glass tube VAL is in a range of approximately 0.01 to 2.00 mm. As the reliability and the workability are deteriorated when the thickness is out of the range, the above-mentioned range of the thickness is suitable.

As for the contour of the graphite film forming the external electrode EL, the inner surface and the outer surface respectively being in contact with the glass tube VAL are both smoothly formed. When the inner surface in contact with the glass tube VAL of the graphite film is not smoothly formed, current concentrates in a location satisfactorily adherent to the glass tube VAL of the graphite film in operation, an accident that a hole is made in the location where current concentrates is caused, and the reliability is deteriorated. As the external electrode is installed in a holder such as a socket in the case where the external electrode EL formed by the graphite film is installed in a backlight, a problem in insulation performance or conductivity such as a convex portion on the surface of the film peels and the touch area with the holder decreases occurs when the outer surface is not smooth.

It is clarified by experiments on adhesive strength by the inventors that as to the material of graphite liquid forming the external electrode EL, material including more water glass is better. For example, in an experiment using a graphite film used inside a cathode ray tube, a graphite film used in a conical part (also called a funnel-shaped part) and a graphite film used in a neck part are compared, not only the latter has overwhelmingly stronger adhesive strength with glass but the strength of the film itself is larger. As for the former, the former partially peels from the surface of glass when a nail is plunged into the dried former. As for the latter, even if a nail is plunged into the dried latter, not only the film itself is not damaged but does not peel from the glass.

Definite difference between both materials is produced by a fact that the latter includes more water glass than the former. It is suitable that water glass is included in a range of approximately 5 to 95 wt % and preferably, it is suitable that water glass is included in a range of approximately 30 to 95 wt %. It is desirable that water glass is mainly made of potassium silicate, however, the material of water glass is not limited to this. The percentage content of graphite is in a range of approximately 1 to 95 wt %. The material of graphite may be also natural. The crystal form of graphite may be also in the shape of a scale or in the shape of a needle, however, it is desirable that the particle diameter of graphite the crystal of which is in the shape of a scale is approximately 50 μm or less. In the case where the crystal of graphite is in the shape of a scale or in the shape of a needle, the particle diameter is defined as a longer diameter.

As another component, metallic oxide, for example, iron oxide or titanium dioxide may be also included.

For means to further enhance the strength of the graphite film forming the external electrode EL, a film made of another material may be also formed on the graphite film and a tape for protecting the surface of the film may be also adhered. As for the material of the tape, a tape made of conductive metal is desirable in consideration of conductivity with the holder such as a socket to which the fluorescent lamp is attached; however, the material is not necessarily required to be conductive. For means to bond the tape, a case where a conductive adhesive is applied to the tape is convenient, however, a conductive adhesive may be also applied to the side of the graphite film beforehand.

Next, the outline of a method of manufacturing the fluorescent lamp with an external electrode will be described.

The method of forming the external electrode of the fluorescent lamp with an external electrode roughly includes a process for cleaning a substrate, a process for applying graphite liquid to the substrate and a process for drying an applied film.

First, the material of the graphite film may be also a graphite solution acquired by mixing graphite in alkaline solution; however, it may be also powder. As the graphite solution including the above-mentioned material is widely in circulation in the world as material for CRT, it is one of characteristics that the graphite solution is low-priced.

Next, for a method of cleaning the substrate, in the case where the graphite solution is applied to the surface of the glass tube VAL that transmits light, it is inevitable to clean the surface of the glass tube VAL. As the graphite solution is repelled or a spot is caused and a uniform electrode cannot be formed when the surface is dirty, the ununiformity of current density is caused in operation, the reliability is deteriorated, the electrostatic capacity of a coupling capacitor with a power source decreases, and current does not sufficiently flow into the fluorescent lamp with an external electrode. Therefore, for means to clean the substrate, sand blasting may be also used for cleaning in addition to cleaning using alkali or acid. When the alkalinity of the graphite solution is increased (the pH is increased), cleaning the substrate and applying the graphite solution are unified and a process for forming the film can be simplified.

Next, for a method of applying the graphite solution, classified roughly, brushing, spraying or dip coating can be used. These means may be independently used or may be combined. In the case of brushing, a brush is made to absorb graphite solution and the graphite solution is applied to electrode forming parts at both ends of the glass tube VAL, however, the brushing may be also manually made and an automatic coater may be also used. In spraying, a spray gun is used. In dip coating, the electrode forming parts at both ends of the glass tube VAL are dipped in graphite solution housed in a container. A method of applying graphite solution using the automatic coater is the easiest. In dip coating, graphite solution may be also vibrated using an ultrasonic wave and in any means, to hold the quality of graphite solution uniform, the graphite solution is required to be stirred or circulated.

Next, for a method of drying a film acquired by applying the graphite solution, the film is dried by heating to enhance the strength of the film and to reduce the process. Drying by heating includes hot air drying, infrared drying, high frequency drying and a method of dipping in high-temperature liquid and any means may be selected, however, unless a drying furnace with special structure is used, hot air drying is superior to increase the quantity of transmitted heat per unit time.

As the diameter of the fluorescent lamp with an external electrode used in the backlight is approximately a few mm and the length in a direction of the glass tube of the electrode depending upon graphite is also short, a hot air dryer which requires only small energy and is small-sized can be used. For the hot air dryer, an industrial dryer may be also used. As graphite is black, it is efficient to use infrared drying.

The fluorescent lamp with an external electrode EEFL configured as described above is lit when a pair of external electrodes EL are installed in the holder such as a socket not shown, the fluorescent lamp is connected to a power circuit and lighting power is supplied to the fluorescent lamp, the fluorescent film FLU on the inner wall of the glass tube VAL is excited, and stable high-intensity emission having high discharge efficiency is acquired through the glass tube VAL for a long term.

According to such configuration, as a pair of external electrodes EL is formed by applying and drying the graphite solution including graphite as main conductive material to the electrode forming parts at both ends of the glass tube VAL, the following action and effect are acquired.

The external electrodes EL can be formed with good adhesivity and at high strength of adhesivity at both ends of the glass tube VAL.

The external electrodes EL can be formed with them chemically stable.

The external electrodes EL can be easily manufactured in a simple process.

The external electrodes EL can be formed at a low cost using low-priced material.

The external electrodes EL have high conductivity.

The external electrodes EL are resistant to flame.

As the external electrodes EL can be formed using stabilized graphite liquid, the fluorescent lamp with an external electrode excellent in quality and reliability can be formed.

Second Embodiment

Figure 2:
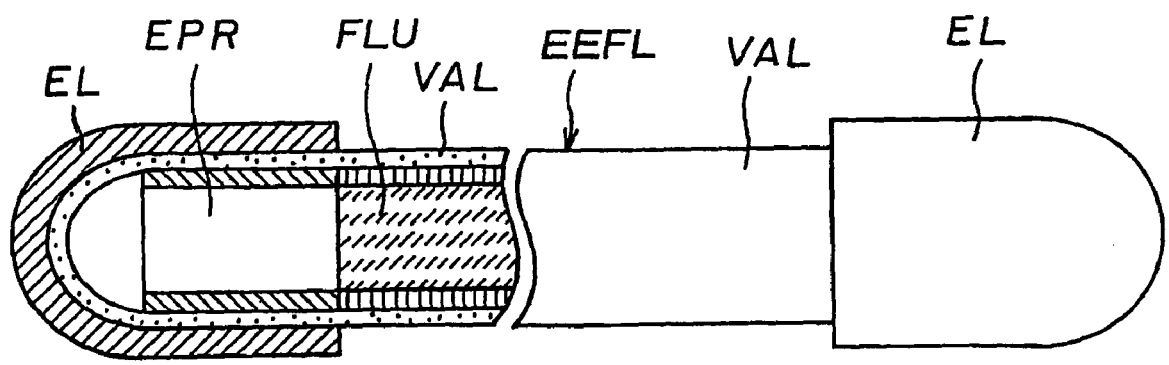
FIG. 2 is an enlarged sectional view showing a main part of the configuration in a second embodiment of the fluorescent lamp with an external electrode according to the invention.

FIG. 2 is an enlarge sectional view enlarging of a main part for explaining the configuration in a second embodiment of the fluorescent lamp with an external electrode according to the invention. The same reference numeral is allocated to the same part as that shown in FIG. 1, and the description is omitted. A fluorescent lamp with an external electrode EEFL shown in FIG. 2 is different from that shown in FIG. 1 in that a conductive electrode inner surface protective coat EPR is formed on each inner wall opposite to a pair of external electrodes EL installed at both ends of a glass tube VAL.

In such configuration, as a pair of electrode inner surface protective coats EPR formed on the inner walls of both ends of the glass tube VAL and a pair of electrodes EL installed on outside faces of both ends of the glass tube VAL are capacitively coupled, discharge between a pair of electrode inner surface protective coats EPR in the glass tube VAL is easily generated, a starting characteristic of the fluorescent lamp EEFL is greatly improved, and lighting time is reduced. In such configuration, high-intensity emission by a fluorescent substance can be similarly stably acquired for a long term.

Third Embodiment

Figure 3:
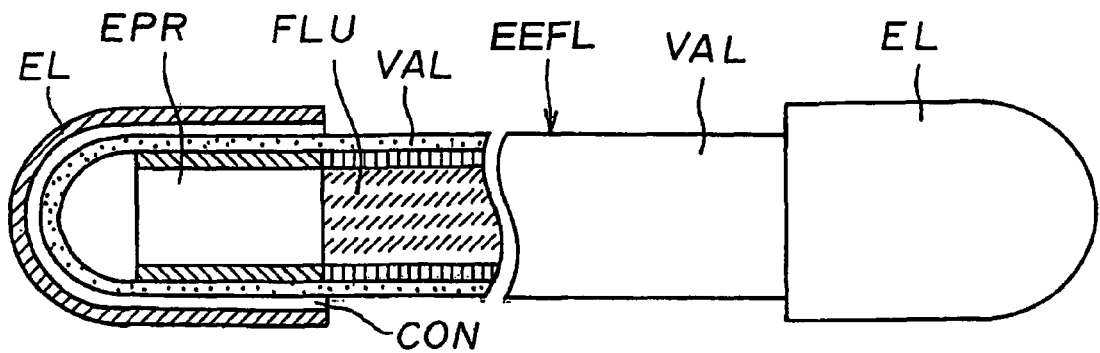
FIG. 3 is an enlarged sectional view showing a main part of the configuration in a third embodiment of the fluorescent lamp with an external electrode according to the invention.

FIG. 3 is an enlarged sectional view of a main part for explaining the configuration in a third embodiment of the fluorescent lamp with an external electrode according to the invention. The same reference numeral is allocated to the same part as those shown in the above-mentioned drawings, and the description is omitted. A fluorescent lamp with an external electrode EEFL shown in FIG. 3 is different from that shown in FIG. 2 in that an electrode backing processing coat CON the surface of which is smooth and which is made of a conductive metallic film is formed between each outside face of both ends of a glass tube VAL and each of a pair of external electrodes EL at both ends of the glass tube VAL by deposition, sputtering or electroless plating for example.

In such configuration, as adhesiveness between the surface of glass and an inner surface of the external electrode EL at both ends of the glass tube VAL is enhanced by providing the smooth electrode backing processing coat CON between the glass tube VAL and the external electrode EL, and capacitive coupling between each of a pair of external electrodes EL installed on the outside faces of both ends of the glass tube VAL and the electrode and an electrode inner surface protective coat EPR formed on an inner surface of the glass tube VAL is further increased, a starting characteristic of the fluorescent lamp with an external electrode EEFL is enhanced, discharge is further easily generated, and lighting time can be greatly reduced. Therefore, stable high-intensity emission can be similarly acquired for a long term.

Fourth Embodiment

Figure 4:
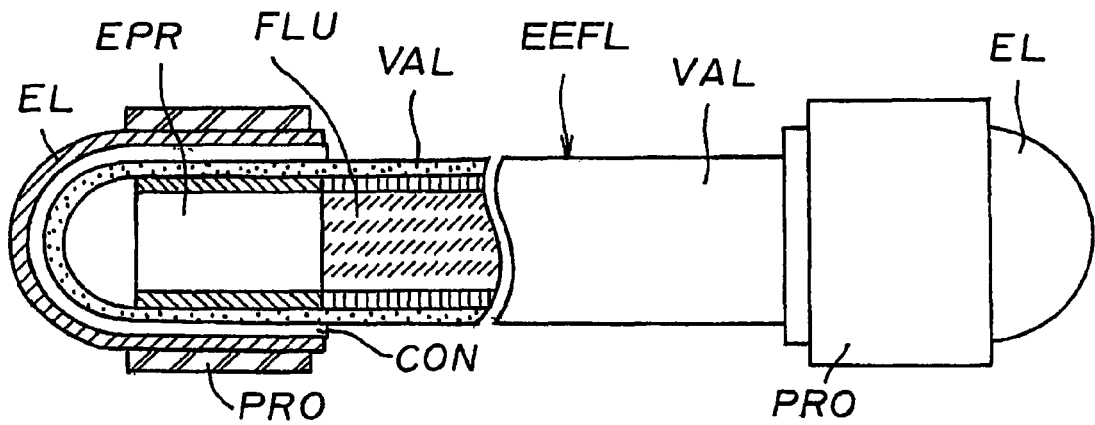
FIG. 4 is an enlarged sectional view showing a main part of the configuration in a fourth embodiment of the fluorescent lamp with an external electrode according to the invention.

FIG. 4 is an enlarged sectional view of a main part for explaining the configuration in a fourth embodiment of the fluorescent lamp with an external electrode according to the invention. The same reference numeral is allocated to the same part as those in the above-mentioned drawings, and the description is omitted. A fluorescent lamp with an external electrode EEFL shown in FIG. 4 is different from that shown in FIG. 3 in that an external electrode protective coat PRO having heat resistance and insulation performance is formed on the periphery of each of a pair of external electrodes EL formed at both ends of a glass tube VAL.

In such configuration, a pair of external electrodes EL can be protected by forming the external electrode protective coat PRO on the periphery of each of a pair of external electrodes EL in addition to the similar action and effect, and the external electrode EL can be prevented from being damaged in handling the fluorescent lamp with an external electrode EEFL or in building it to a backlight.

In the above-mentioned embodiments, the fluorescent lamp with an external electrode has been described, however, a starting characteristic of the following fluorescent lamp can be also greatly improved by forming a graphite film on an inner wall of a glass tube opposite to a cold cathode, on the outside face of the glass tube or on the inner surface and the outside face of the glass tube in an internal electrode-type cold cathode fluorescent lamp.

Even if a tube made of resin which almost transmits ultraviolet rays and transmits light is used in place of the glass tube VAL which forms the fluorescent lamp with an external electrode EEFL and transmits light in the above-mentioned embodiments, the similar effect is acquired.

Fifth Embodiment

FIGS. 5A and 5B show a direct backlight for explaining the configuration in a first embodiment of the backlight according to the invention, where FIG. 5A is a plan showing a main part viewed from the upside, and FIG. 5B is an enlarged sectional view showing the main part viewed along a line A-A shown in FIG. 5A. In the backlight BL shown in FIGS. 5A and 5B, a reflector RFP is fixed and laid at the inside bottom of a lower frame DFL. At both ends of the lower frame DFL, a pair of upper and lower holders HOL is arranged with plural concave portions CUT each inside diameter of which is slightly larger than the outside diameter of an external electrode EL integrally formed at predetermined intervals formed integrally therewith. As the holders HOL help predetermined starting voltage to be fed to the external electrode EL of a fluorescent lamp with an external electrode EEFL, a part or the whole of it is formed by a conductive member.

After each fluorescent lamp with an external electrode EEFL on both end sides of which the external electrode EL is formed is positioned in each concave portion CUT formed in a pair of holders HOL with the respective external electrodes EL mounted at both ends, each fluorescent lamp with an external electrode EEFL is fixed and installed in each concave portion CUT of the corresponding holder HOL by pressing a pressure member PRE in a direction shown by an arrow from the upside. The pressure member PRE is fixed and the lower frame DFL may be also pressed in a direction shown by an arrow from the downside. Further, a pair of holders can be also simultaneously pressed from both directions shown by the arrows.

In a normally used backlight, a feeding part of a fluorescent lamp with an external electrode is covered with a white light diffusing plate or others to increase the economic efficiency of fluorescence radiated from the fluorescent lamp with an external electrode, however, the pressure member PRE can also function as the above-mentioned cover.

Sixth Embodiment

FIG. 6 is an enlarged sectional view showing a direct backlight for explaining the configuration in a second embodiment of the backlight according to the invention and equivalent to the sectional view viewed along the line A-A shown in FIG. 5A. The same reference numeral is allocated to the same part as that shown in FIGS. 5A and 5B, and the description is omitted. The backlight BL shown in FIG. 6 has a structure where an adhesive ADH is applied to a part of a pair of upper and lower holders HOL provided with plural concave portions CUT to enhance workability, so that a once-positioned fluorescent lamp with an external electrode EEFL is fixed to prevent the fluorescent lamp from being dislocated. A binding agent can also be used in place of the adhesive ADH. It is desirable that the adhesive ADH or a binding agent has conductivity; however, it is not necessarily required to be provided with conductivity.

Seventh Embodiment

FIG. 7 is an enlarged sectional view showing a direct backlight for explaining the configuration in a third embodiment of the backlight according to the invention and equivalent to the sectional view viewed along the line A-A shown in FIG. 5A. The same reference numeral is allocated to the same part as that shown in FIGS. 5A and 5B, and the description is omitted. As for the backlight BL shown in FIG. 7, a holder HOL provided with plural concave portions CUT and a pressure plate PRP may be also formed by working a metallic plate by press molding to enhance workability, however, in the case where a resin formed body is used, a conductive film, for example, a nickel film formed by plating nickel (Ni) on the surface of the resin formed body electrolessly, a graphite film, or another film made of conductive paste may be also formed in at least a part of the resin formed body.

A pressure sensitive adhesive double coated tape DPT using a conductive adhesive is adhered at a predetermined interval in at least a part on the pressure plate PRP for pressing a fluorescent lamp with an external electrode EEFL in each concave portion CUT of the holder HOL, the external electrodes EL of the plural fluorescent lamps with the external electrode EEFL are bonded onto the double coated tape DPT and are arranged in parallel, and the pressure plate may be also pressed on the holder HOL in a direction shown by an arrow.

Eighth Embodiment

FIG. 8 is an enlarged sectional view showing a direct backlight for explaining the configuration in a fourth embodiment of the backlight according to the invention and equivalent to the sectional view viewed along the line A-A shown in FIG. 5A. The same reference numeral is allocated to the same part as that shown in FIGS. 5A and 5B, and the description is omitted. As for the backlight BL shown in FIG. 8, a pressure sensitive adhesive double coated tape DPT using a conductive adhesive is adhered in a predetermined position on a pressure plate PRP for pressing a fluorescent lamp with an external electrode EEFL in each concave portion CUT of a holder HOL to enhance workability, the external electrodes EL of plural fluorescent lamps with the external electrode EEFL are bonded onto the double coated tape DPT at a predetermined interval and are arranged in parallel, and the pressure plate may be also pressed on the holder HOL in a direction shown by an arrow.

A single-sided tape, having conductive material, such as aluminum and copper as a base on one surface, may be also used in place of the double coated tape DPT. In the case where the single-sided tape is used, the single-sided tape may be also adhered on the pressure plate PRP. Conductive rubber may be also used in at least a part of the holder HOL provided with the concave portions CUT, or the pressure plate PRP. Further, an elastic member provided with resiliency or its structure other than conductive rubber may be also used in at least a part of the holder HOL provided with the concave portions CUT or the pressure plate PRP.

According to such configuration, as a pair of holders HOL are formed by a conductive member and the plural concave portions CUT each inside diameter of which is larger than the outside diameter of the external electrode EL are integrally formed with the holders HOL, positioning in the case where the plural fluorescent lamps with the external electrode EEFL are attached to the backlight BL is facilitated, the assembly is facilitated, and a function as an electrode for supplying power required for the plural fluorescent lamps with the external electrode EEFL and a holding function can be simultaneously realized.

Ninth Embodiment

FIGS. 9A and 9B are explanatory drawings for explaining the configuration in a fifth embodiment of the fluorescent lamp with an external electrode according to the invention, where FIG. 9A is a sectional view cut in a longitudinal direction of a tube, and FIG. 9B is a sectional view viewed along a line A-A perpendicular to the longitudinal direction of the tube. The same reference numeral is allocated to the same part as that in the above-mentioned drawings, and the description is omitted. In a fluorescent lamp with an external electrode EEFL shown in FIGS. 9A and 9B, an electrode forming part having double structure that an inside glass tube VALL having an outside diameter smaller than an inside diameter of a glass tube VAL is welded by each welding part MEL is formed at both ends, and the external electrode EL made of a graphite film is formed on the periphery of the electrode forming part. The electrode forming part is configured so that the outside diameter of the inside glass tube VALL is smaller than the inside diameter of the outside glass tube VAL.

As for the external electrode EL formed in the electrode forming part, a graphite film formed on an inner wall of the inside glass tube VALL and the graphite film formed on an outside face of the outside glass tube VAL are electrically in contact and are electrically connected. No fluorescent film FLU is formed on each inner wall of the glass tube VAL on which the external electrode EL is formed and the inside glass tube VALL.

It is suitable that the thickness of the graphite film formed on the inner wall of the inside glass tube VALL forming the external electrode EL is in a range of approximately 0.10 to 1.00 mm similarly to the thickness of the graphite film formed on the outside face of the outside glass tube VAL. It is also suitable that the outer diameter of the fluorescent lamp with an external electrode EEFL is 2 mm or more. When the outside diameter of the fluorescent lamp with an external electrode EEFL is approximately 2 mm or less, the outside diameter of the inside glass tube VALL is required to be extremely small or the thickness of the outside glass tube VAL is required to be thinned and the workability and the reliability are deteriorated. Further, it is suitable that the length of the inside glass tube VALL is in a range of approximately 5 to 50 mm. When the length of the inside glass tube VALL is approximately 50 mm or more, the workability and the reliability are deteriorated.

For material of the external electrode EL, conductive paste such as silver paste or copper paste may be also used in place of graphite paste and for the conductive paste, metallic material having a high-melting point which is hardly melted at high temperature is effective in manufacturing double tube structure. The inside glass tube VALL and the outside glass tube VAL can be welded without closing an opening of the inside glass tube VALL by forming an ultraviolet protective film HMF over all the inner wall of the glass tube VAL before a fluorescent film FLU is applied on the inner wall of the glass tube VAL. In the case where the external electrode EL is easily oxidized at high temperature, manufacturing in inert gas such as processing in nitrogenous atmosphere is required.

For the electrode connected to the inside glass tube VALL, a metal pipe or a metal bar may be also used. In the case where the electrode is oxidized at high temperature, manufacturing in inert gas including no oxygen such as processing in nitrogenous atmosphere is required.

According to such configuration, as the surface area of the electrode increases without extending the external electrode EL, the efficiency in discharge of the fluorescent lamp with an external electrode EEFL can be maintained or enhanced.

Tenth Embodiment

Figure 10:
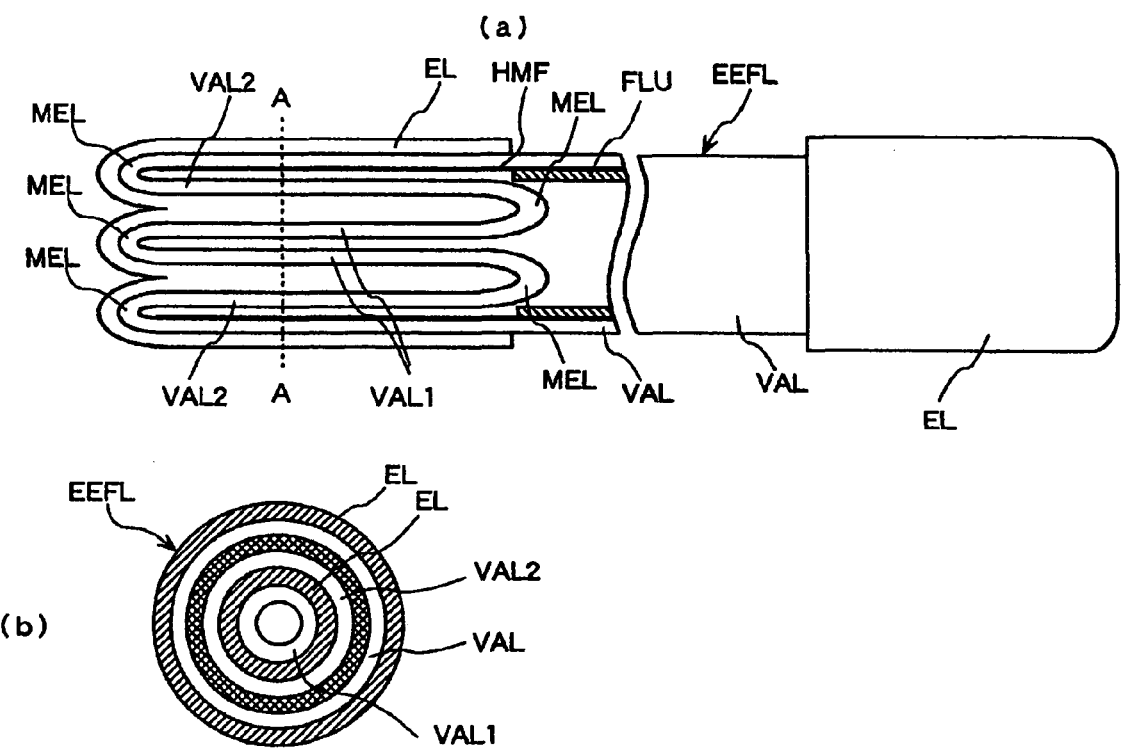
FIGS. 10A and 10B show the configuration in a sixth embodiment of the fluorescent lamp with an external electrode according to the invention, where

FIGS. 10A and 10B are explanatory drawings for explaining the configuration in a sixth embodiment of the fluorescent lamp with an external electrode according to the invention, where FIG. 10A is a sectional view viewed in a longitudinal direction of a tube, and FIG. 10B is a sectional view viewed along a line A-A in a direction perpendicular to the longitudinal direction of the tube. The same reference numeral is allocated to the same part as those in the above-mentioned drawings, and the description is omitted. In a fluorescent lamp with an external electrode EEFL shown in FIGS. 10A and 10B, a second inside glass tube VAL1 having an outside diameter smaller than an inside diameter of a glass tube VAL and a first glass tube VAL2 having an outside diameter larger than the outside diameter of the second glass tube VAL1 and smaller than the inside diameter of the glass tube VAL are combined and are welded via each weld MEL, and an electrode forming part having triple structure is formed at both ends.

That is, the electrode forming part is configured so that it has relation that the outside diameter of the second inside glass tube VAL1 is smaller than the inside diameter of the first inside glass tube VAL2 and has relation that the outside diameter of the glass tube VAL2 is smaller than the inside diameter of the outside glass tube VAL. The external electrode EL made of a graphite film is formed on the periphery of the electrode forming part of the glass tube VAL.

According to such configuration, as the surface area of the external electrode EL further increases, compared with the electrode forming part having the double structure without extending the electrode by forming the electrode forming part at both ends of the glass tube VAL in triple structure, the further effect of maintaining or enhancing the efficiency of discharge is acquired. The tremendous effect of maintaining or enhancing the efficiency of discharge is acquired by forming the electrode forming part in quadruple or more structure.

Figure 11:
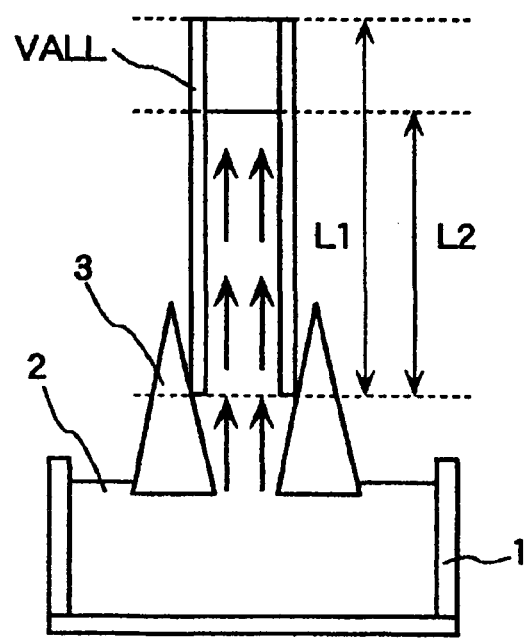
FIG. 11 is a sectional view for explaining a method of manufacturing the configuration shown in FIGS. 9A and 9B of the fluorescent lamp with an external electrode according to the invention.

Next, referring to sectional views showing main parts shown in FIGS. 11 to 27, a concrete method of producing the fluorescent lamp with an external electrode shown in FIGS. 9A and 9B will be described. First, the inside glass tube VALL that transmits light having a predetermined diameter is manufactured. Next, as shown in FIG. 11, graphite solution 2 is housed in a container 1 and a coating system in which auxiliary pipes 3 for absorbing the graphite solution 2 by surface tension are set is prepared in the graphite solution 2. Next, the end of the inside glass tube VALL is dipped in the level of the graphite solution 2 along the auxiliary pipes 3 and the graphite solution 2 is sucked in a direction shown by arrows. At this time, the length of application L2 is limited, compared with the length of the tube L1 using an infrared laser to prevent the graphite solution 2 from being applied up to the upper end of the inside glass tube VALL.

As described above, the graphite solution 2 can be applied on the inner wall of the inside glass tube VALL without adhering to an outer wall of the inside glass tube VALL after application by using the auxiliary pipes 3. When the graphite solution 2 adheres to the outer wall of the inside glass tube VALL, the graphite solution hinders welding when the inside glass tube is welded to the outside glass tube VAL in the next process and a leak is caused. It is desirable that a member which is made of rubber or resin and does not damage the inside glass tube VALL is used for the auxiliary pipes 3 in consideration of contact with the inside glass tube VAL.

Figure 12:
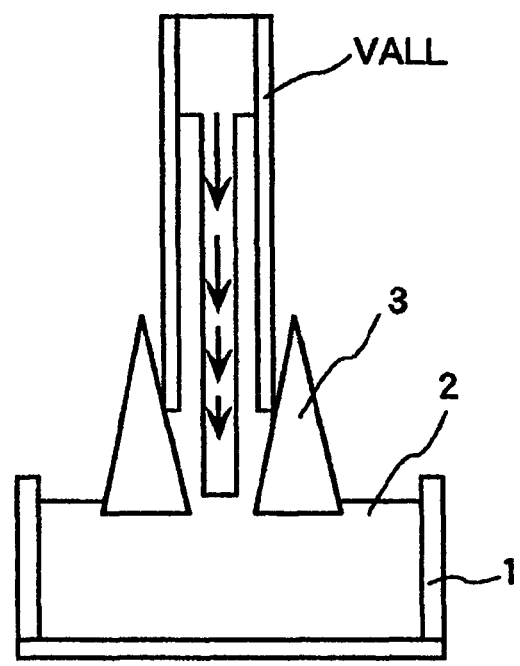
FIG. 12 is a sectional view showing a process following FIG. 11 for explaining the method of manufacturing the fluorescent lamp with an external electrode according to the invention.
Figure 13:
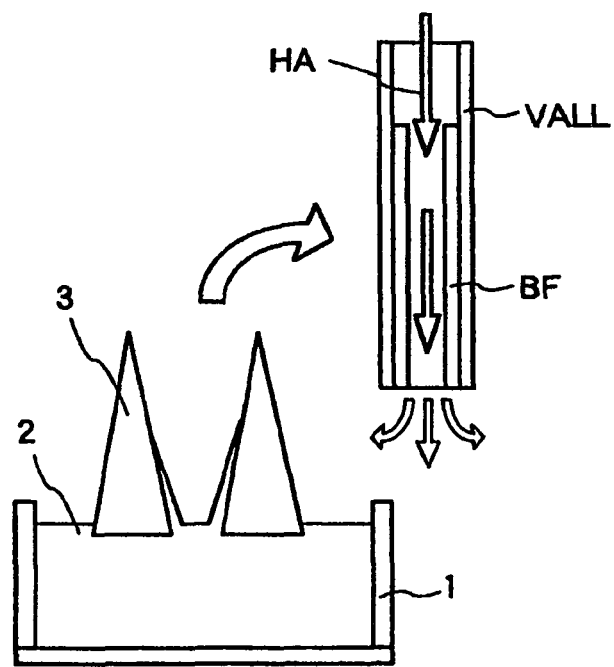
FIG. 13 is a sectional view showing a process following FIG. 12 for explaining the method of manufacturing the fluorescent lamp with an external electrode according to the invention.

Next, the graphite solution is applied on the inner wall of the inside glass tube VALL by returning the graphite solution 2 sucked in the inside glass tube VALL in a direction shown by arrows as shown in FIG. 12. Afterward, the inside glass tube VALL is pulled up as shown in FIG. 13, and air or a hot blast HA is blown from the upside as shown by arrows until the graphite solution 2 is dried. As a result, a graphite film BF is formed.

Figure 14:
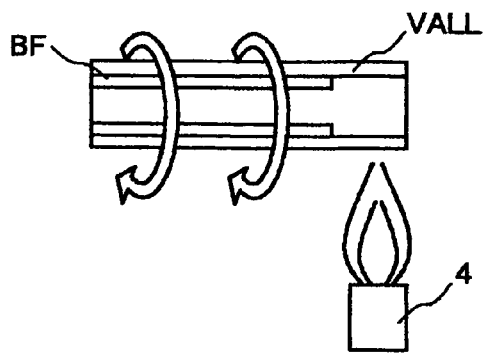
FIG. 14 is a sectional view showing a process following FIG. 13 for explaining the method of manufacturing the fluorescent lamp with an external electrode according to the invention.
Figure 15:
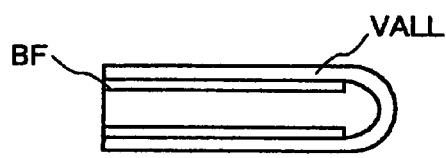
FIG. 15 is a sectional view showing a process following FIG. 14 for explaining the method of manufacturing the fluorescent lamp with an external electrode according to the invention.

Next, after the graphite film BF is formed, by heating and sintering the other end where no graphite film BF is applied of the inside glass tube VALL using a gas burner 4 or others while turning it in a circumferential direction as shown in FIG. 14, a part of an electrode forming part having an outer shape having a graphite formed inside one end, and rounded at the other end as shown in FIG. 15 is formed.

Figure 16:
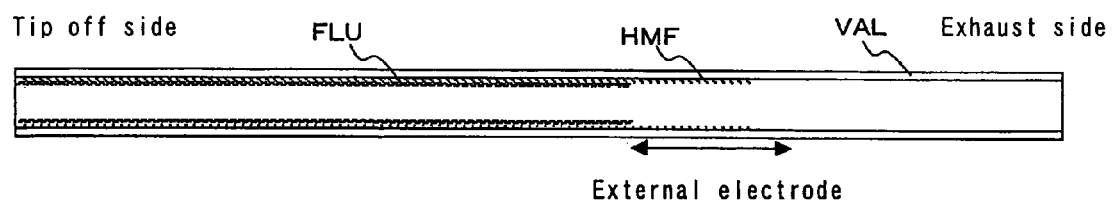
FIG. 16 is a sectional view showing a process following FIG. 15 for explaining the method of manufacturing the fluorescent lamp with an external electrode according to the invention.

Next, a method of producing the outside glass tube VAL will be described. First, the outside glass tube VAL that transmits light having a predetermined diameter is produced as shown in FIG. 16. Next, the ultraviolet protective film HMF and the fluorescent film FLU are sequentially formed on the inner wall of the glass tube VAL by application. In relation to FIGS. 16 to 24, a right side part of the glass tube VAL is called an exhaust side and a left side part is called a sealed side.

Figure 17:
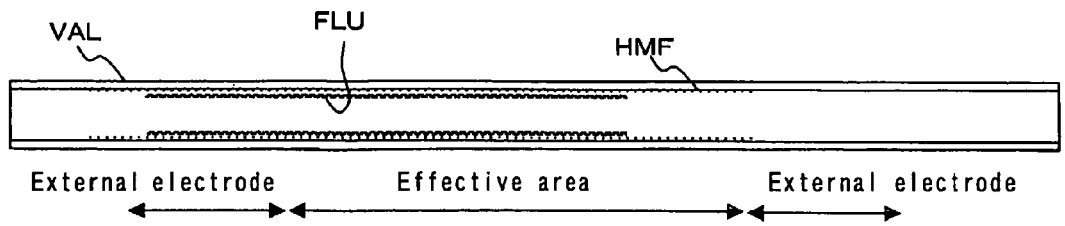
FIG. 17 is a sectional view showing a process following FIG. 16 for explaining the method of manufacturing the fluorescent lamp with an external electrode according to the invention.

Next, as shown in FIG. 17, the fluorescent film FLU and the ultraviolet protective film HMF are once removed up to the electrode part on the sealed side and a ultraviolet protective film HMF is applied to the removed part again. No fluorescent film FLU is required to be applied to an area to be an electrode when the fluorescent lamp with an external electrode is completed and it is clarified as a result of an experiment that the service life of the fluorescent film FLU is improved by executing the above-mentioned processing. After the application of the fluorescent film FLU is completed, the fluorescent film is baked at high temperature of approximately 500 to 700° C. When a hot blast is blown from the exhaust pipe side in baking, the efficiency of the processing is enhanced.

Figure 18:
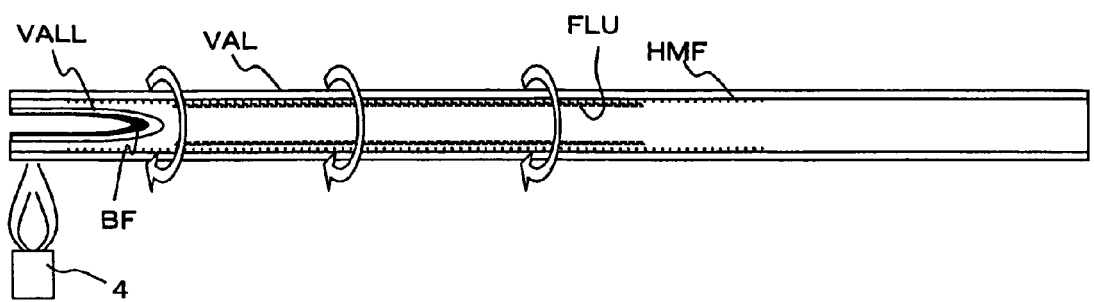
FIG. 18 is a sectional view showing a process following FIG. 17 for explaining the method of manufacturing the fluorescent lamp with an external electrode according to the invention.

Next, as shown in FIG. 18, after baking, the inside glass tube VALL on the inner wall completed in FIG. 15 of which the graphite film BF is formed is welded to the sealed side by incorporating the inside glass tube VALL into the sealed side to be an electrode forming part of the glass tube VAL. By heating the outside glass VAL using the gas burner 4 or others while turning the outside VAL in the circumferential direction. At this time, it is desirable that the ultraviolet protective film HMF in a welded part of the outside glass tube VAL is completely removed. When the ultraviolet protective film HMF remains in the welded part, a leak may be caused. When the graphite film BF is formed on the inside the inside glass tube VALL beforehand, the inside glass tube VALL can be welded without closing an open end of the inside glass tube VALL at this time. This reason is that the graphite film BF has high resistance to heat and is hardly soluble.

Figure 19:
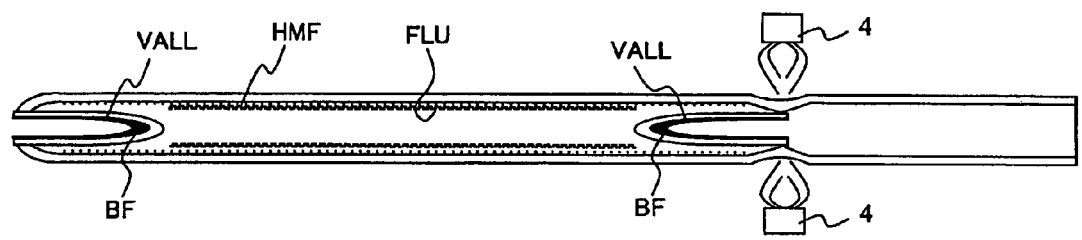
FIG. 19 is a sectional view showing a process following FIG. 18 for explaining the method of manufacturing the fluorescent lamp with an external electrode according to the invention.
Figure 20:
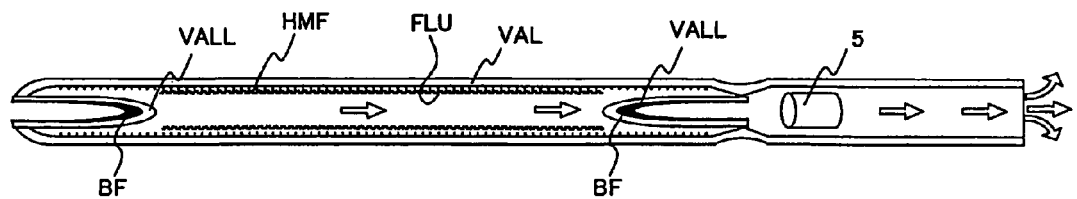
FIG. 20 is a sectional view showing a process following FIG. 19 for explaining the method of manufacturing the fluorescent lamp with an external electrode according to the invention.

Next, after the sealed side of the outside glass tube VAL is welded as shown in FIG. 19, the inside glass tube VALL completed in FIG. 15 is combined with the exhaust its side. As the inside glass tube is in a temporarily combined condition, it has only to be welded in plural locations by heating it using the gas burner 4 or others and is not to be tightly sealed. After the inside glass tube is temporarily combined, a mercuric dispenser 5 is put in from the exhaust side of the outside glass tube VAL as shown in FIG. 20 and exhaust is made in a direction shown by arrows. After exhaust, the inside glass tube is tightly sealed by filling low-pressure neon (Ne) and argon (Ar) and by continuously heating the exhaust side using the gas burner or others.

Figure 21:
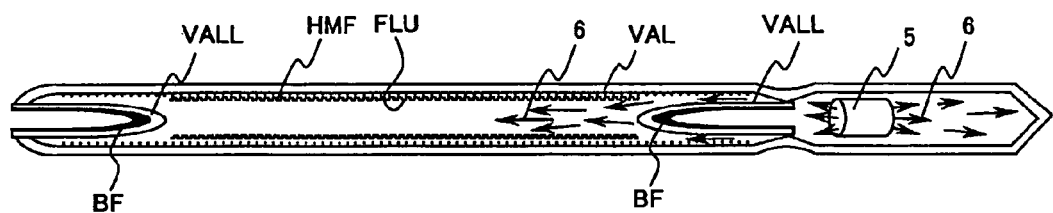
FIG. 21 is a sectional view showing a process following FIG. 20 for explaining the method of manufacturing the fluorescent lamp with an external electrode according to the invention.

Next, a high-frequency electric field is applied as shown in FIG. 21, the mercuric dispenser 5 is heated, and mercury 6 is diffused inside. An area including the mercuric dispenser 5 on the right side of the inside glass tube VALL on the exhaust side is heated at a temperature of approximately 350 to 400° C. to prevent the mercury 6 from existing as shown in FIG. 21, the mercury 6 is vaporized, and is transferred into the tube in which the fluorescent film FLU is applied on the left side.

Figure 22:
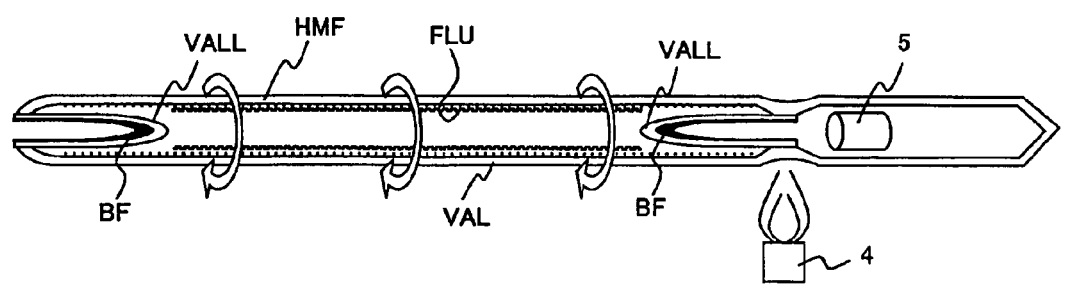
FIG. 22 is a sectional view showing a process following FIG. 21 for explaining the method of manufacturing the fluorescent lamp with an external electrode according to the invention.
Figure 23:
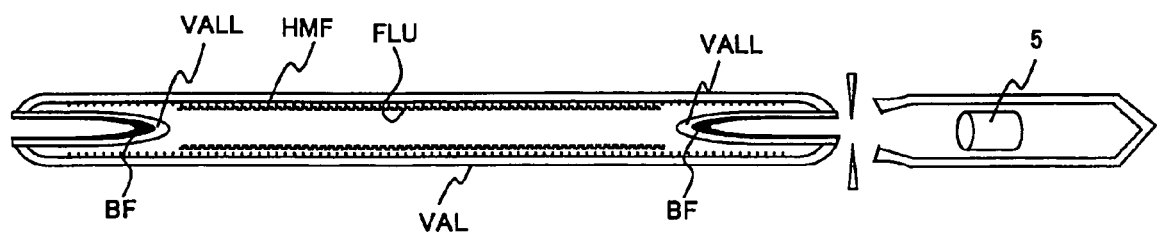
FIG. 23 is a sectional view showing a process following FIG. 22 for explaining the method of manufacturing the fluorescent lamp with an external electrode according to the invention.

Next, after the mercury 6 is transferred, the temporarily combined end on the exhaust side of the glass tube VAL is completed sealed by heating the end on the exhaust side using the gas burner 4 or others while turning the outside glass tube VAL in the circumferential direction as shown in FIG. 22. After the end is sealed, the area including the unnecessary mercuric dispenser 5 is cut off as shown in FIG. 23.

Figure 24:
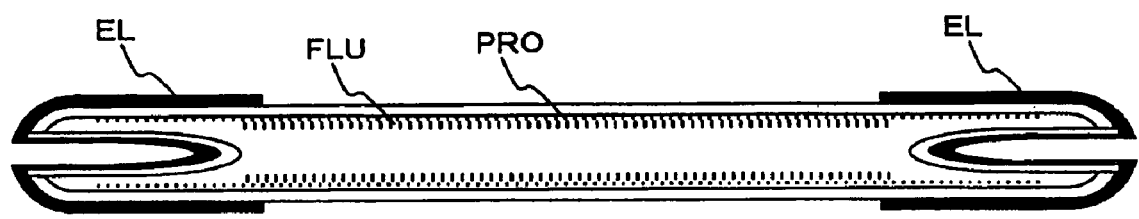
FIG. 24 is a sectional view showing a process following FIG. 23 for explaining the method of manufacturing the fluorescent lamp with an external electrode according to the invention.

Finally, as shown in FIG. 24, a fluorescent lamp with an external electrode EEFL where an external electrode EL electrically connected to a graphite film BF formed on an inner wall of a concave portion of the inside glass tube VALL is formed is completed by applying the graphite solution to both ends to be an electrode forming part of the glass tube VAL by dip coating or another method and drying it. As the graphite solution is difficult to be securely applied when the surface of the electrode forming part at both ends of the glass tube VAL is dirty before the graphite solution is applied, it is effective to clean the surface using alkaline solution or acid solution beforehand or to execute a process such as shot blasting.

Figure 25:
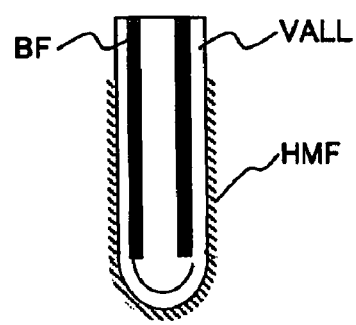
FIG. 25 is a sectional view showing a process following FIG. 24 for explaining the method of manufacturing the fluorescent lamp with an external electrode according to the invention.
Figure 26:
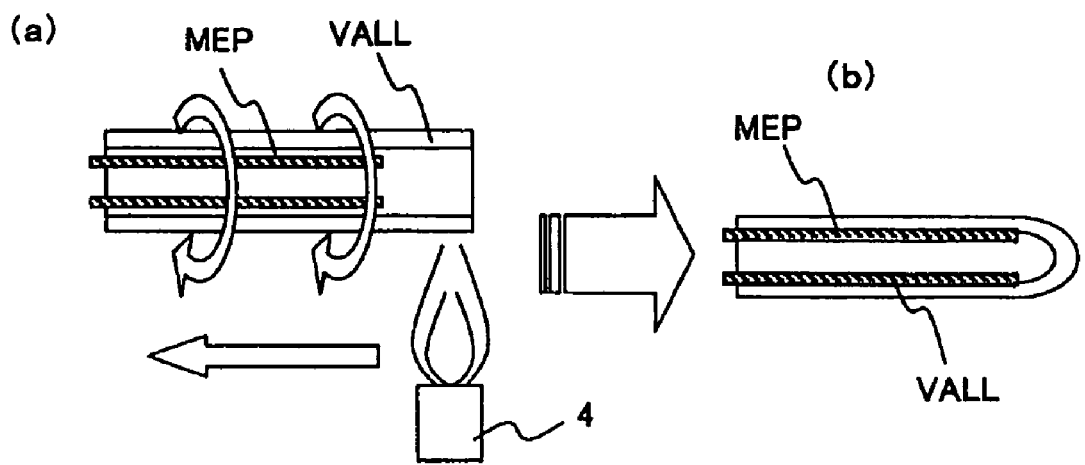
FIG. 26 is an enlarged sectional view showing a main part of an inside glass tube for explaining a transformed example of the fluorescent lamp with an external electrode according to the invention.
Figure 27:
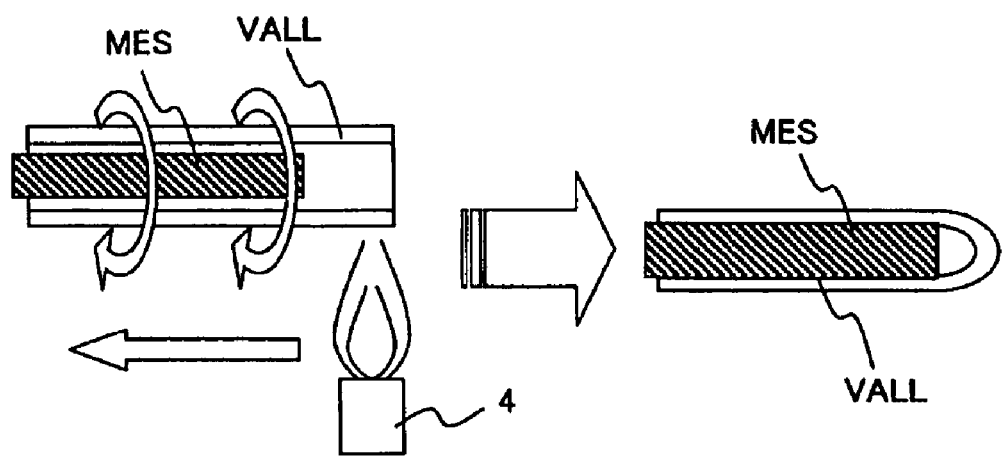
FIG. 27 is an enlarged sectional view showing a main part of an inside glass tube for explaining another transformed example of the fluorescent lamp with an external electrode according to the invention.

An ultraviolet protective film HMF acquired by applying an ultraviolet hardening agent to the outside face of the inside glass tube VALL and drying it may be also formed as shown in FIG. 25. For the material of the electrode formed inside the inside glass tube VALL, in place of the film made of the graphite solution or conductive paste, a metallic pipe MEP shown in FIG. 26A or a metallic bar MES shown in FIG. 27A may be also used. In that case, the respective inside glass tubes VALL are required to be heated using the gas burner 4 or others while turning them in the circumferential direction and reciprocating them in each axial direction of the tubes so that the respective inside glass tubes are completely in contact with the surface of each metal as shown in FIG. 26B and in FIG. 27B.

Figure 28:
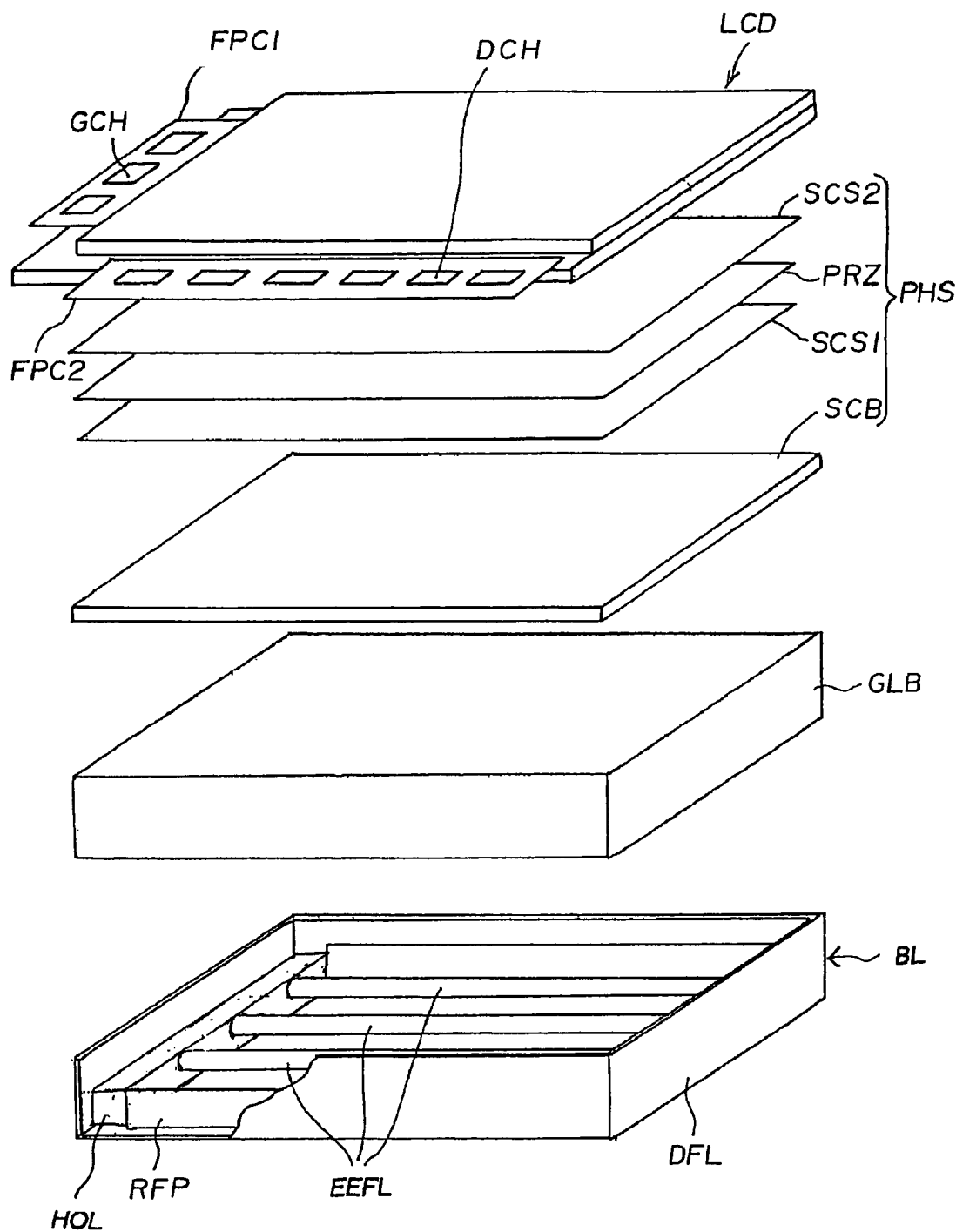
FIG. 28 is a spread perspective view for schematically explaining an example of the configuration of a liquid crystal display device using the backlight according to the invention.
Figure 29:
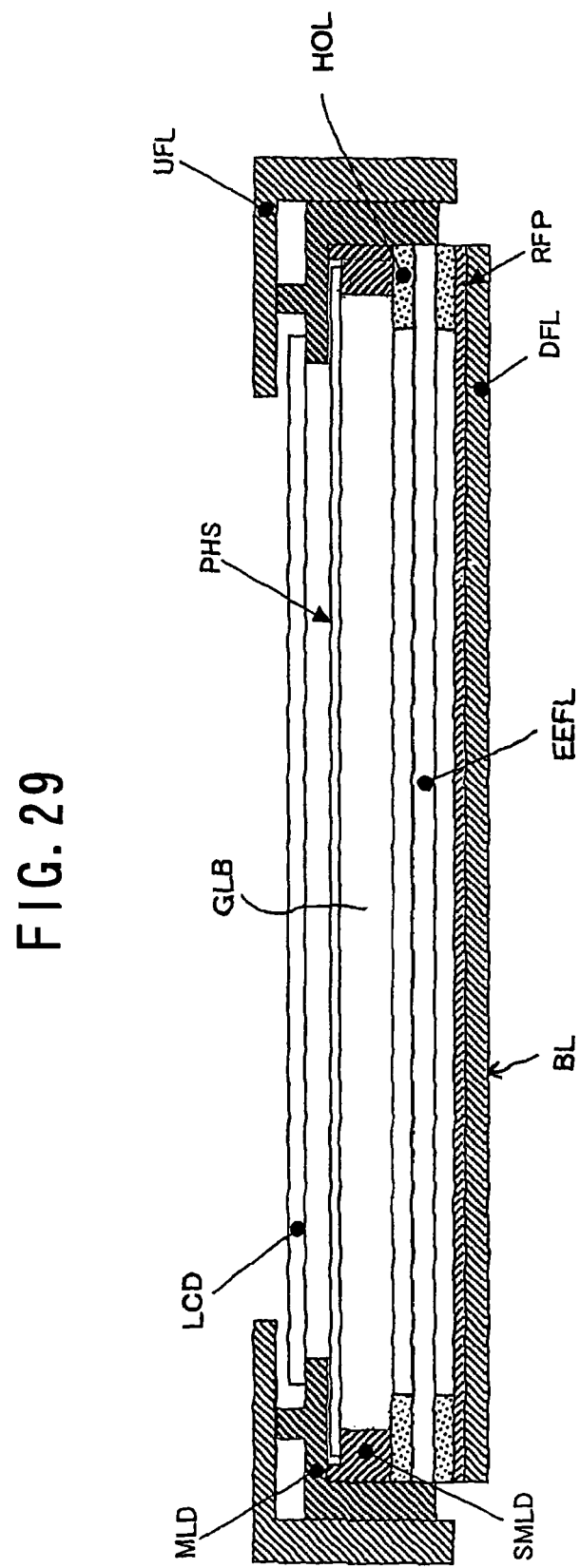
FIG. 29 is a sectional view showing a main part for schematically explaining the example of the configuration of the liquid crystal display device in which component members are integrated.

FIG. 28 is a spread perspective view for schematically explaining an example of the configuration of a liquid crystal display device as a display device using the direct backlight as a backlight. An upper frame is located on the upside of a liquid crystal display panel LCD, however, in FIG. 28, it is omitted. FIG. 29 is a sectional view for schematically explaining the configuration of the liquid crystal display device in which component members are assembled. Further, the example of the configuration of the backlight viewed from the side of optically compensating sheet laminate shown in FIG. 28 is shown in FIG. 5A. FIG. 29 is equivalent to a sectional view viewed along a line B-B shown in FIG. 5A.

As shown in FIGS. 28, 29 and FIG. 5A, in the liquid crystal display panel LCD, a liquid crystal layer is sealed between transparent glass substrates provided with each electrode for forming picture elements, two sides of one glass substrate (normally also called an active matrix substrate) are protruded from the other substrate (normally also called a color filter substrate), and a flexible printed circuit board FPC1 on which a scanning signal line driving circuit chip GCH is mounted and a flexible printed circuit board FPC2 on which a data signal line driving circuit chip DCH is mounted are mounted on the protruded parts.

In such a liquid crystal display device, a reflector RFP is installed inside a lower frame DFL, plural fluorescent lamps with the external electrode EEFL are installed at a predetermined interval in parallel in a pair of holders HOL on the reflector with both ends supported, and the backlight BL is formed. The lower frame DFL is formed by a metallic plate and is integrated with the upper frame UFL similarly formed by a metallic plate with the liquid crystal display panel LCD and the optically compensating sheet laminate PHS overlapped between the lower frame and the upper frame. As the size of the liquid crystal display panel LCD is large-sized, the fluorescent lamp with an external electrode EEFL is extended. The fluorescent lamp with an external electrode EEFL is a fluorescent lamp formed by the small-diameter glass tube VAL and normally, both ends functioning as the external electrode EL are supported by the holders HOL made of a conductive rubber bush or others.

Further, in the liquid crystal display device, a light transmission plate GLB made of transparent resin is installed on the backlight BL and further, a group of plural types of optically compensating sheets is installed on the light transmission plate GLB (between the light transmission plate and the liquid crystal display panel LCD). The optically compensating sheet laminate PHS includes a diffusion plate SCB, a first diffusion sheet SCS1, crossed two prism sheets PRZ and a second diffusion sheet SCS2 with them overlapped. The direct backlight BL is provided with a side holding frame SMLD made of resin, provided to the side of the lower frame DFL provided with a bottom and the side and called a side mold, each peripheral end of the light transmission plate GLB and the optically compensating sheet laminate PHS is bridged on the side holding frames SMLD and is held.

After the backlight BL holding the light transmission plate GLB and the optically compensating sheet laminate PHS as shown in FIG. 29 is combined with the liquid crystal display panel LCD by a mold frame MLD, the upper frame UFL covers them, the upper frame UFL and the lower frame DFL are connected by a fitting member not shown and are integrated, and the liquid crystal display device is formed. In the case where the liquid crystal display panel LCD is large-sized, a light diffusion plate or a light diffusion sheet is used in place of the light transmission plate GLB.

According to the fluorescent lamp with an external electrode according to the invention, as the length of the electrode is reduced and the surface area of the electrode is greatly enlarged, extremely excellent effect that high discharge effect is acquired is produced. As the surface area of the electrode is enlarged, extremely excellent effect that concentrated conduction is hardly caused and the fluorescent lamp with an external electrode is also hardly damaged is produced. Further, as bending structure in the external electrode forming part of the fluorescent lamp with an external electrode is not required and high discharge efficiency is acquired, extremely excellent effect that space which the fluorescent lamp with an external electrode occupies is reduced and the handling of the fluorescent lamp with an external electrode is facilitated is produced.

Besides, according to the backlight according to the invention, as continuity with the fluorescent lamp with an external electrode is made extremely satisfactory and the fluorescent lamp with an external electrode can be precisely held in an installed position, extremely excellent effect that the installed position is precisely maintained for a long term without deteriorating the continuity by vibration and shock and high-intensity lighting is acquired stably for a long term is produced. Besides, as the component members of the backlight are simplified and the cost is reduced, extremely excellent effect that the workability of assembly is enhanced and the automation of assembly can be easily realized is produced.

Further, according to the display device according to the invention, as fluorescence having high discharge efficiency by the fluorescent lamp with an external electrode is acquired, extremely excellent effect that image display of high intensity and high quality is acquired at saved energy for a long term is produced.

What is claimed is:

1. A fluorescent lamp with an external electrode, wherein:
   a fluorescent film is formed on an inner wall of a glass tube;
   a graphite film is formed on each outside face of both ends of the glass tube inside which noble gas or noble gas and mercury are filled;
   each of both ends of the glass tube is provided with a concave portion concaved toward the center in an axial direction of the tube;
   the concave portion is formed by an inner glass welded with the glass tube at a welded portion at the ends of the glass tube and the inner glass;
   an ultraviolet protective film is provided on the inner wall of the glass tube other than at the welded portion of the glass tube and the inner glass; and
   the length of the concave portion is in a range of 5 to 50 mm.

2. The fluorescent lamp with an external electrode according to claim 1, wherein:
   another graphite film is formed on the inner glass so as to be continuous with the graphite film on the outside face of the ends of the glass tube.

3. The fluorescent lamp with an external electrode according to claim 1, wherein:
   the percentage content of graphite included in the graphite film is in a range of 1 to 95 wt %.

4. The fluorescent lamp with an external electrode according to claim 1, wherein:
   the thickness of the graphite film is 0.01 to 2.00 mm.

5. The fluorescent lamp with an external electrode according to claim 1, wherein:
   a mean value of a crystal grain of graphite in the graphite film is 50 µm or less.

6. The backlight according to claim 1, wherein a mean value of a crystal grain of graphite in the graphite film is 50 µm or less.

7. The fluorescent lamp with an external electrode according to claim 1, wherein the ultraviolet protective film is initially provided on the inner wall of the glass tube, and a portion of the ultraviolet protective film at the welded portion of the glass tube and the inner glass is removed prior to formation of the welded portion so as to suppress leakage at the welded portion.

8. A fluorescent lamp with an external electrode, wherein:
   a fluorescent film is formed on an inner wall of the glass tube;
   a graphite film is formed on each outside face of both ends of the glass tube inside which noble gas or noble gas and mercury are filled;
   each of both ends of the glass tube is provided with a concave portion concaved toward the center in an axial direction of the tube;
   the concave portion is formed by an inner glass welded with the glass tube at a welded portion at the ends of the glass tube and the inner glass;

an ultraviolet protective film is provided on the inner wall of the glass tube other than at the welded portion of the glass tube and the inner glass; and the concave portion is longer than a diameter of the glass tube.

9. The fluorescent lamp with an external electrode according to claim 8, wherein:

another graphite film is formed on the inner glass so as to be continuous with the graphite film on the outside face of the ends of the glass tube.

10. The fluorescent lamp with an external electrode according to claim 8, wherein the ultraviolet protective film is initially provided on the inner wall of the glass tube, and a portion of the ultraviolet protective film at the welded portion of the glass tube and the inner glass is removed prior to formation of the welded portion so as to suppress leakage at the welded portion.

11. A backlight comprising:

a fluorescent lamp with at least one external electrode;

a reflector arranged at a back of the fluorescent lamp with the at least one external electrode; and a frame for housing the fluorescent lamp with the at least one external electrode and the reflector, wherein:

the fluorescent lamp with the at least one external electrode includes a fluorescent film formed on an inner wall of a glass tube thereof, a graphite film formed on each outside face of both ends of the glass tube inside of which noble gas or noble gas and mercury are filled, each of both ends of the glass tube is provided with a concave portion concaved toward a center in an axial direction of the tube, the concave portion is formed by an inner glass welded with the glass tube at a welded portion at the ends of the glass tube and the inner glass, an ultraviolet protective film is provided on the inner wall of the glass tube other than at the welded portion of the glass tube and the inner glass, and a length of the concave portion is in a range of 5 to 50 mm.

12. The backlight according to claim 11, wherein another graphite film is formed on the inner glass so as to be continuous with the graphite film on the outside face of the ends of the glass tube.

13. The backlight according to claim 11, wherein:

at least two fluorescent lamps with an external electrode at respective both ends thereof are provided and arranged in parallel;

upper and lower holders are provided for holding the at least the two fluorescent lamps with the external electrodes from above and below the external electrodes at the respective both ends; and a conductive member is arranged at a position where the respective external electrodes of the at least the two fluorescent lamps are arranged in the upper and lower holders.

14. The backlight according to claim 13, wherein:

a concave portion is formed in at least one of the upper holder and the lower holder according to positions of the respective external electrodes of the at least the two fluorescent lamps.

15. The backlight according to claim 11, wherein:

at least two fluorescent lamps with an external electrode at respective both ends thereof are provided and arranged in parallel;

a holder for holding the respective both ends of the at least the two fluorescent lamps is provided; and a conductive adhesive or binding agent is arranged at positions where the respective external electrodes of the at least two fluorescent lamps are arranged in the holder.

16. The backlight according to claim 15, wherein:

the holder is arranged below each of the external electrodes of the at least the two fluorescent lamps; and an adhesive or a binding agent is arranged on an upper side of each of the external electrodes of the fluorescent lamps.

17. The fluorescent lamp with an external electrode according to claim 11, wherein the ultraviolet protective film is initially provided on the inner wall of the glass tube, and a portion of the ultraviolet protective film at the welded portion of the glass tube and the inner glass is removed prior to formation of the welded portion so as to suppress leakage at the welded portion.

18. A display device comprising:

a display panel for displaying an image; and a backlight arranged at a back of the display panel, wherein:

the backlight comprises:

a fluorescent lamp with at least one external electrode;

a reflector arranged at a back of the fluorescent lamp; and a frame for housing the fluorescent lamp and the reflector; wherein the fluorescent lamp includes a fluorescent film formed on an inner wall of a glass tube thereof, a graphite film formed on each outside face of both ends of the glass tube inside of which noble gas or noble gas and mercury are filled, each of the both ends of the glass tube is provided with a concave portion concaved toward a center in an axial direction of the tube, the concave portion being formed by an inner glass welded with the glass tube at a welded portion at the ends of the glass tube and the inner glass, an ultraviolet protective film is provided on the inner wall of the glass tube other than at the welded portion of the glass tube and the inner glass, another graphite film is formed on the inner glass so as to be continuous with the graphite film on the outside face of the ends of the glass tube, and a length of the concave portion is in a range of 5 to 50 mm.

19. The display device according to claim 18, wherein:

at least two fluorescent lamps with an external electrode at respective both ends thereof are provided and arranged in parallel in the backlight;

upper and lower holders for holding the at least the two fluorescent lamps from above and below at positions of the external electrodes at the respective both ends; and the upper holder and the lower holder include a conductive member arranged at positions in which the external electrodes of the at least the two fluorescent lamps are arranged.

20. The display device according to claim 19, wherein:

a concave portion is formed in at least one of the upper holder and the lower holder according to positions of the respective external electrodes of the at least the two fluorescent lamps.

21. The display device according to claim 18, wherein:

at least two fluorescent lamps with an external electrode at respective both ends thereof are provided and arranged in parallel in the backlight; and a holder for holding the respective both ends of the at least two fluorescent lamps is provided, and a conductive adhesive or a binding agent is arranged at positions in the holder in which the respective external electrodes of the at least the two fluorescent lamps are arranged.

22. The display device according to claim 21, wherein:

the holder is arranged below the respective external electrodes of the at least the two fluorescent lamps; and an adhesive or a binding agent is arranged on an upper side of the external electrodes of the fluorescent lamps.

23. The fluorescent lamp with an external electrode according to claim 18, wherein the ultraviolet protective film is initially provided on the inner wall of the glass tube, and a portion of the ultraviolet protective film at the welded portion of the glass tube and the inner glass is removed prior to formation of the welded portion so as to suppress leakage at the welded portion.

* * * * *